United States Patent
Liu et al.

(10) Patent No.: US 11,392,473 B2
(45) Date of Patent: Jul. 19, 2022

(54) AUTOMATED EXTENSION OF PROGRAM DATA STORAGE

(71) Applicant: International Business Machines Corporation, Armonk, NY (US)

(72) Inventors: Zhen Liu, Beijing (CN); Ming Lei Zhang, Beijing (CN); Jia Tian Zhong, Beijing (CN); Le Chang, Beijing (CN); Ting Ting Zhan, Beijing (CN); Xiao Yan Tian, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/117,405

(22) Filed: Dec. 10, 2020

(65) Prior Publication Data

US 2022/0188206 A1    Jun. 16, 2022

(51) Int. Cl.
*G06F 8/40* (2018.01)
*G06F 11/30* (2006.01)
(Continued)

(52) U.S. Cl.
CPC .............. *G06F 11/302* (2013.01); *G06F 8/41* (2013.01); *G06F 11/0772* (2013.01); *G06F 11/327* (2013.01); *G06F 2201/84* (2013.01)

(58) Field of Classification Search
CPC .... G06F 11/302; G06F 11/41; G06F 11/0772; G06F 11/327; G06F 2201/84; G06F 8/41;
(Continued)

(56) References Cited

U.S. PATENT DOCUMENTS 6,804,682 B1    10/2004   Kemper et al.
7,676,510 B1 *   3/2010   Karinta ............... G06F 11/1448
                                                            707/654
(Continued)

OTHER PUBLICATIONS

Jianxin Li et al., ConSnap: Taking Continuous Snapshots for Running State Protection of Virtual Machines, IEEE, 2014, retrieved online on May 20, 2022, pp. 1-8. Retrieved from the Internet: <URL: https://ieeexplore.IEEE.org/stamp/stamp.jsp?tp=&arnumber=7097869>. (Year: 2014).*

(Continued)

*Primary Examiner* — Hanh Thi-Minh Bui
(74) *Attorney, Agent, or Firm* — Peter K. Suchecki (57) ABSTRACT

Provided is a method for determining data storage is insufficient for a program. A processor may receive a set of marked data associated with a set of source code. The processor may identify a scope of the code associated with the marked data. The processor may generate a first set of instructions for taking a first snapshot of a variable storage space associated with the marked data when entering the scope and a second snapshot of the variable storage space when exiting the scope. The processor may generate a second set of instructions for comparing the first and second snapshots to determine a usage amount of the variable storage. The processor may generate a third set of instructions for performing an action in response to the usage amount of the variable storage space exceeding a threshold. The processor may compile the code into an executable.

16 Claims, 8 Drawing Sheets

(51) Int. Cl.
*G06F 11/32* (2006.01)
*G06F 8/41* (2018.01)
*G06F 11/07* (2006.01)

(58) Field of Classification Search
CPC ...... G06F 8/4434; G06F 8/425; G06F 8/4432; G06F 8/4441
See application file for complete search history.

(56) References Cited

U.S. PATENT DOCUMENTS

| | | | |
|---|---|---|---|
| 8,782,621 | B2 | 7/2014 | Slavin et al. |
| 9,619,367 | B1 | 4/2017 | Huang et al. |
| 10,558,479 | B2 | 2/2020 | Baskaran et al. |
| 2003/0139905 | A1 | 7/2003 | Flelsper et al. |
| 2008/0148102 | A1 | 6/2008 | Tseytin et al. |
| 2014/0007058 | A1* | 1/2014 | Bates .......... G06F 11/3624 717/129 |
| 2016/0124728 | A1* | 5/2016 | Mahaffey .......... G06F 11/34 717/158 |

OTHER PUBLICATIONS

IBM, "z/OS XL C++ compiler listing components," https://www.ibm.com/support/knowledgecenter/SSLTBW_2.4.0/com.ibm.zos.v2r4.cbcux01/cxlstcomp.htm, accessed Jun. 10, 2020, 6 pgs.

Mell et al., "The NIST Definition of Cloud Computing," Recommendations of the National Institute of Standards and Technology, U.S. Department of Commerce, Special Publication 800-145, Sep. 2011, 7 pgs.

Roussel et al., "Allocation efficiency in high-performance Go services," Link: https://segment.com/blog/allocation-efficiency-in-high-performance-go-services/, Sep. 19, 2017, 13 pgs.

Unknown, "ARCAD Transformer Field," https://www.arcadsoftware.com/products/arcad-transformer-field-field-refactoring/, printed Dec. 10, 2020, 2 pgs.

Search Report, Application No. GB2116912.3, dated May 11, 2022, 4 pgs.

* cited by examiner

```
1  #include <stdio.h>
2  const int MAX_HEADCOUNT=1000;
3  typedef struct {
4      unsigned short   id;
5      char             name[50];
6      ...
7  } Employee_Info;
8  int main(void)
9  {
10     Employee_Info emp_table[MAX_HEADCOUNT];
11     Employee_Info emp_sort_table[MAX_HEADCOUNT*2];
12     short i;
13     Employee_Info * emp_current;
14
15     read in the employee information into emp_table;
16     sort emp_table into emp_sort_table via emp_current;
17
18     /* print the name list of all employee */
19     for (i=0; i<MAX_HEADCOUNT; i++)
20     {
21        if (emp_table[i].id == 0 )
22           break;
23        printf("%d: is %s\n", i, emp_table[i].name);
24     }
25     return 0;
26 }
```

FIG. 4

```
                  Cross    Reference
           Marked Data and Associated References:
   • Variables              References
   • emp_table              10 15 16 21 23     ← 502
   • emp_sort_table         11 16              ← 504
   • emp_current            13 16              ← 506
   • i                      12 19 21 23        ← 508
   • MAX_HEADCOUNT           2 10 11 19        ← 510
```

AUTOMATED EXTENSION OF PROGRAM DATA STORAGE

BACKGROUND

The present disclosure relates generally to the field of data storage and, more specifically, to automatically generating data usage statements used to determine when data storage has become insufficient for a respective computer program.

Computer programs are, to some extent, reflections of the real world. Some programs live far longer than expected, resulting in unexpected program instability when used for current day processing tasks.

SUMMARY

Embodiments of the present disclosure include a method, computer program product, and system for automatically determining when data storage has become insufficient for a respective computer program. A processor may receive a set of marked data associated with a set of source code. The processor may identify a scope of the source code associated with the marked data. The processor may generate a first set of instructions for taking a first snapshot of a variable storage space associated with the marked data when entering the scope and a second snapshot of the variable storage space when exiting the scope. The processor may generate a second set of instructions for comparing the first and second snapshots to determine a usage amount of the variable storage space associated with the marked data. The processor may generate a third set of instructions for performing an action in response to the usage amount of the variable storage space exceeding a threshold. The processor may compile the source code into an executable. The executable may include the first, second, and third sets of instructions.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of data storage and, more particularly, to automatically generating data usage statements used to determine when data storage has become insufficient for a respective computer program. While the present disclosure is not necessarily limited to such applications, various aspects of the disclosure may be appreciated through a discussion of various examples using this context.

Computer programs are, to some extent, reflections of the real world. Some programs live far longer than expected, resulting in unexpected program instability when used for current day processing tasks. For example, as more data representing real-world objects (e.g., products, goods, monetary values, etc.) is generated and gathered for various software applications, in many instances certain underlying programs may encounter errors due to insufficient data size used to represent these real-world objects. For example, an array size implemented in program code may not be large enough to handle the current data and must be increased. Typically, this type of code modification and/or maintenance work is performed after a programmer recognizes the issue due to program instability. Further, in many instances, the underlying code may be difficult to correct and/or may be prone to incur coding errors or mistakes when a programmer attempts to increase the data size for the respective program.

Embodiments of the present disclosure relate to a method, computer program product, and system that uses compiler technology to designate when marked data will require an increase in data storage usage over a time period. In embodiments, a compiler is configured to translate computer code written in one programming language into another language. For example, the compiler may translate source code and marked data (e.g., an array or data that has been identified as requiring increased data storage/space over a time period) into internal code to create an executable program.

In embodiments, the compiler may identify a scope of the marked data associated with the source code. The scope may designate what code may require an expansion in data storage or variable storage space over a time period. The compiler may automatically generate data usage statements for the marked data during compiling. When a respective executable program is running, the usage of marked data is generated at any time as needed. In some embodiments, the compiler may generate the marked data usage statement when generating internal code. For example, the compiler may generate a first set of instructions (e.g., internal code) for taking a first snapshot of the variable storage space associated with the marked data when entering the scope and a second snapshot of the variable storage space when exiting the scope. The set of instructions may be inserted into the executable program code during compile. In some embodiments, the compiler may generate a second set of instructions for comparing the first and second snapshots. The second set of instructions may be inserted into the executable program code during compile. In some embodiments, the processor may generate a third set of instructions for performing an action in response to the usage amount of the variable storage space exceeding a threshold. The third set of instructions may be inserted into the executable program code during compile.

In embodiments, while the executable program is running, the instructions cause the executable program to take a first and second snapshot of the variable storage space and compare the data usage of the variable storage space. From the comparison, a percentage of data usage is calculated. In embodiments, if the marked data from the data usage statement exceeds a certain predetermined limitation (e.g., a data usage threshold, a data usage limit, etc.) an action may be performed.

For example, when the marked data exceeds a data storage limit of 85% for the respective executable program, the system may be configured to generate a notification and output the notification to a user. The notification may be in the form of a warning indicating the data storage limit has been exceeded. The notification may be generated and sent to a user via any type of warning mechanism (e.g., through a user interface or a remote device) when a data storage limit has been exceeded.

In some embodiments, the compiler may generate a compile listing file that may be outputted to a user. In embodiments, the compile listing file includes cross-reference information of associated data (e.g., variables, values, etc.) of the marked data. The compile listing file may be further outputted to a user to aid the user in modifying the respective program code in response to a notification that the data limit threshold has been reached. In this way, using the cross-reference information from the compile listing file allows the programmer to expedite the code modification process by easily identifying the marked data and any associated data in the program code. Further, the cross-reference information allows the programmer to reduce errors by being able to quickly access relevant information and carefully improve program stability.

In some embodiments, the system may utilize machine learning to analyze past data and/or marked data sets to automatically make determinations on which programs may need modification and/or an increase in data storage usage. For example, based on changes and/or modification to program code for historic arrays, the system may identify similar arrays that may be coming close to and/or exceed data limits based on the data usage statements. Using this information, the system may automatically adjust the data storage for the respective executable program without the need of human intervention.

The aforementioned advantages are example advantages, and not all advantages are discussed. Furthermore, embodiments of the present disclosure can exist that contain all, some, or none of the aforementioned advantages while remaining within the spirit and scope of the present disclosure.

Figure 1:
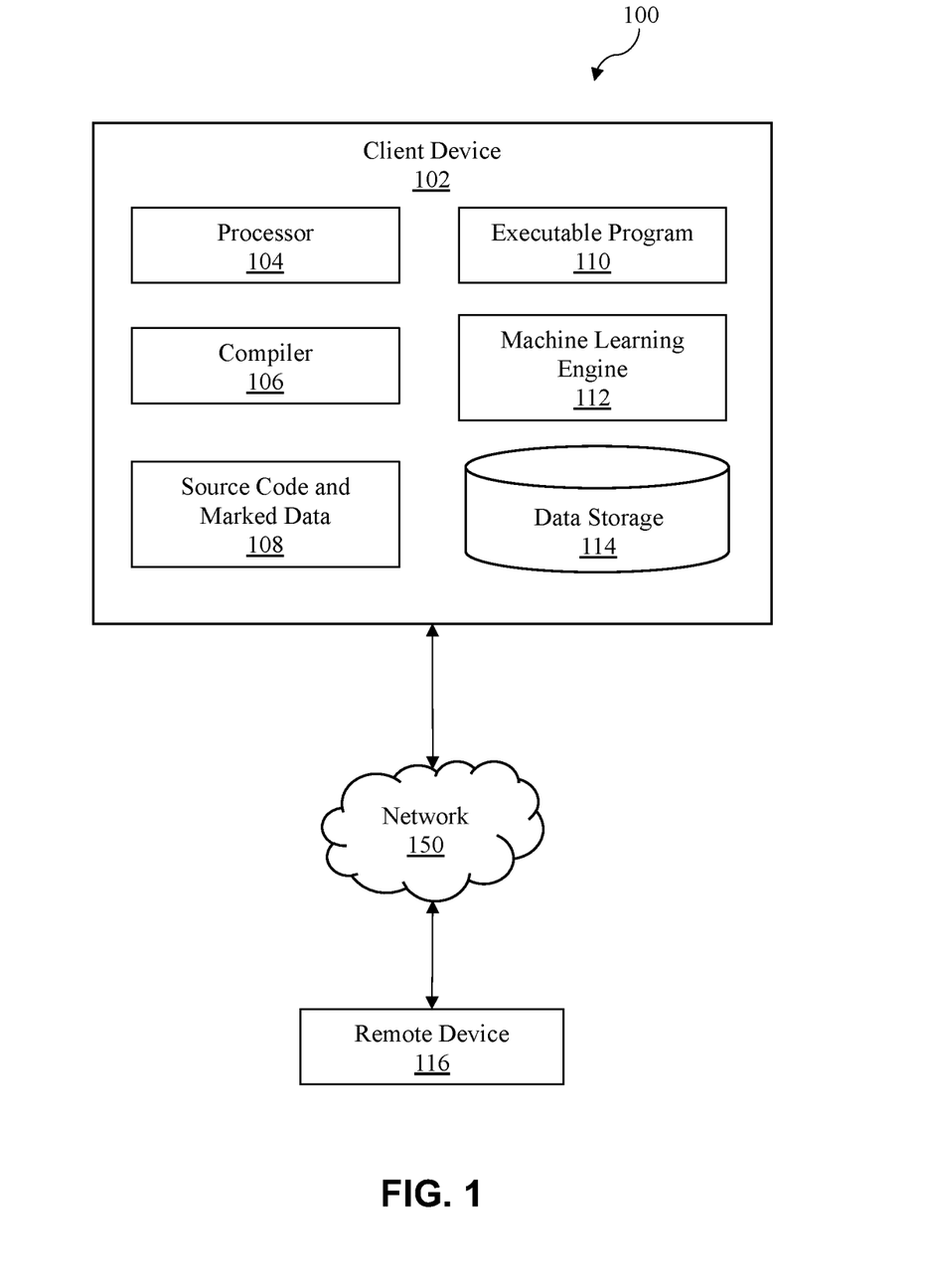
FIG. 1 illustrates a block diagram of an example system, in accordance with embodiments of the present disclosure.

With reference now to FIG. 1, shown is a block diagram of example system 100, in accordance with embodiments of the present disclosure. In the illustrated embodiment, system 100 includes client device 102 that is communicatively coupled to remote device 116 via network 150. Client device 102 and remote device 116 may be configured as any type of computer system and may be substantially similar to computer system 1101 of FIG. 6. In embodiments, client device 102 and/or remote device 116 may be a standalone computing devices or virtual software applications. For example, client device 102 may be a virtual application located on a server (not shown) that is accessed by remote device 116 through a cloud computing network, while remote device 116 may be configured as a personal computer (e.g., laptop, desktop, smartphone, etc.) operated by a user.

Network 150 may be any type of communication network, such as a wireless network or a cloud computing network. Network 150 may be substantially similar to, or the same as, cloud computing environment 50 described in FIG. 7. In some embodiments, network 150 can be implemented using any number of any suitable communications media. For example, the network may be a wide area network (WAN), a local area network (LAN), a personal area network (PAN), an internet, or an intranet. In certain embodiments, the various systems may be local to each other, and communicate via any appropriate local communication medium.

For example, client device 102 may communicate with remote device 116 using a WAN, one or more hardwire connections (e.g., an Ethernet cable) and/or wireless communication networks. In some embodiments, the various systems may be communicatively coupled using a combination of one or more networks and/or one or more local connections. For example, in some embodiments client device 102 may communicate with remote device 116 using a hardwired connection, while in some embodiments communication between remote device 116 and client device 102 may be through a wireless communication network.

In the illustrated embodiment, client device 102 includes processor 104, compiler 106, source code and marked data 108, executable program 110, machine learning engine 112, and data storage 114. In some embodiments, remote device 116 may include the same, some, or similar components as client device 102.

In embodiments, compiler 106 is configured to translate (e.g., compile) computer code written in one programming language into another language. For example, compiler 106 may translate source code and marked data 108 into internal code to create executable program 110. In embodiments, compiler 106 may perform multiple types of operations such as preprocessing, lexical analysis, parsing, semantic analysis (e.g., syntax-directed translation), conversion of input programs to an intermediate representation, code optimization, and code generation, which are described further in FIG. 2. In embodiments, compiler 106 may automatically generate data usage statements from source code and marked data 108. The data usage statements may be used to generate a notification when data storage 114 (e.g., variable storage space) is insufficient for executable program 110. For example, by utilizing data usage statements generated by the compiler 106, a notification may be generated and sent to a user (e.g., via remote device 116) when a data storage limit has been exceeded (e.g., data storage limit of 90%).

In embodiments, machine learning engine 112 may comprise various machine learning engines (artificial neural network, correlation engines, reinforcement feedback learning model, supervised/unsupervised learning model, etc.) configured to analyze data generated by the system 100 to improve predictions for determining modifications to data storage 114. For example, machine learning engine 112 may collect, monitor, and/or analyze past marked data and/or program code changes to automatically make determinations on which programs may need a modification (e.g., increase) to data storage. For example, based on previous changes and/or modification to program code for historic arrays, the system may identify similar arrays that may be coming close to or exceeding data limits based on the data usage statements. Using this historical data, the system 100 may automatically predict and/or adjust the data storage for the respective executable program prior to exceeding various limits without the need of human intervention.

Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBDT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

FIG. 1 is intended to depict the representative major components of system 100. In some embodiments, however, individual components may have greater or lesser complexity than as represented in FIG. 1, components other than or in addition to those shown in FIG. 1 may be present, and the number, type, and configuration of such components may vary. Likewise, one or more components shown with system 100 may not be present, and the arrangement of components may vary.

For example, while FIG. 1 illustrates an example system 100 having a single client device 102 and a single remote device 116 that are communicatively coupled via a single network 150, suitable network architectures for implementing embodiments of this disclosure may include any number of client devices, remote devices, and networks. The various models, modules, systems, and components illustrated in FIG. 1 may exist, if at all, across a plurality of client devices, remote devices, and networks.

Figure 2:
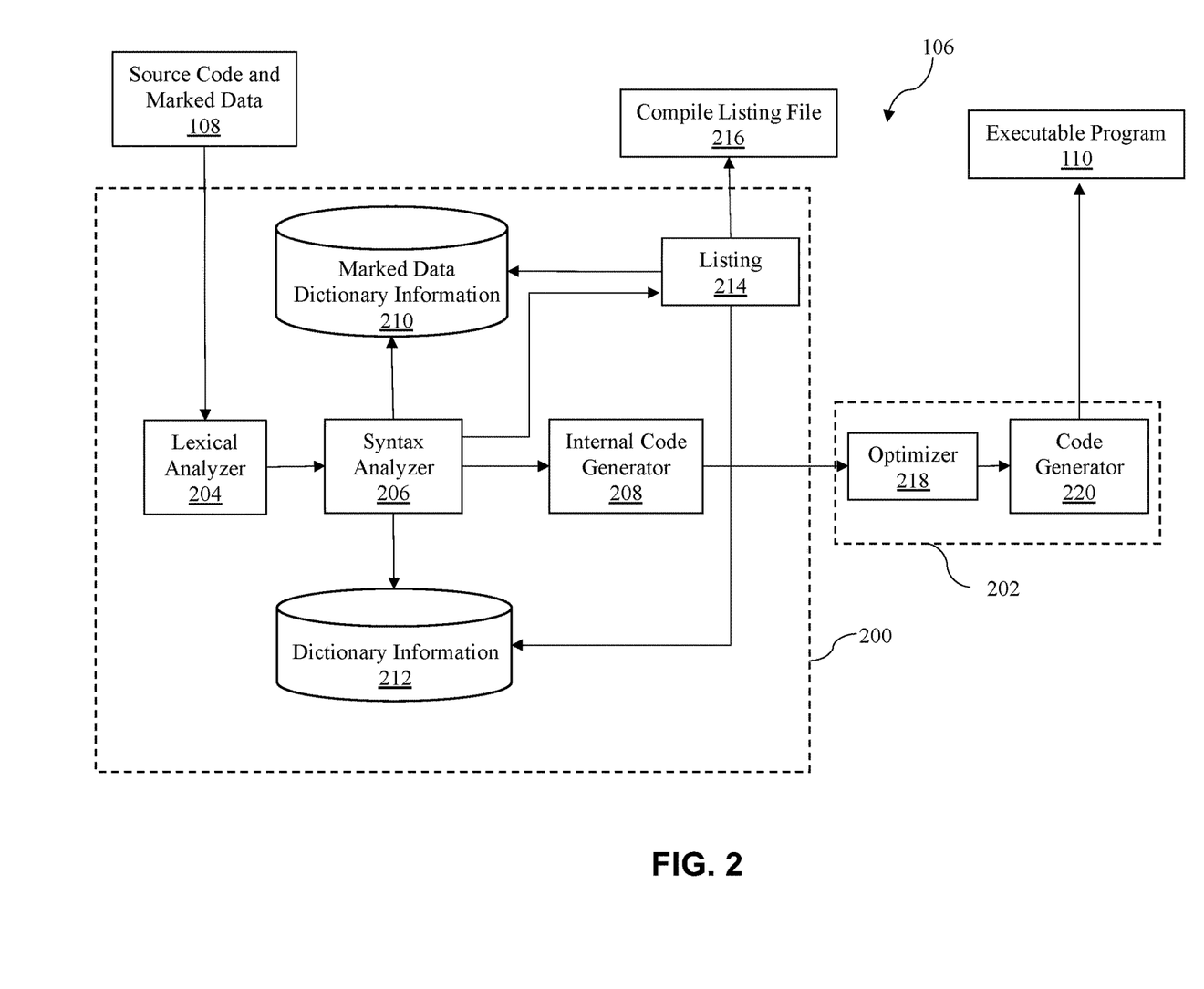
FIG. 2 illustrates a block diagram of an example compiler, in accordance with embodiments of the present disclosure.

Referring now to FIG. 2, shown is block diagram of an example compiler 106, in accordance with embodiments of the present disclosure. Compiler 106 may be the same as or similar to compiler 106 in FIG. 1. In the illustrated embodiment, the compiler 106 comprises a front-end layer 200 and a back-end layer 202. In embodiments, the front-end layer 200 comprises lexical analyzer 204, syntax analyzer 206, internal code generator 208, marked data dictionary information 210, dictionary information 212, and listing 214. The back-end layer 202 comprises optimizer 218 and code generator 220.

In embodiments, the lexical analyzer 204 is configured to perform lexical analysis on the received source code and marked data 108. Once the lexical analysis is performed, the syntax analyzer 206 performs a syntax analysis to determine if the given input is in the correct syntax of the programming language. During the lexical analysis and syntax analysis phase, the compiler 106 generates dictionary information 212 and marked data dictionary information 210, which includes the marked data and associated data. The dictionary information 212 and marked data dictionary information 210 may include cross-reference information shared between the marked data and the associated data (e.g., variables, values, etc.).

In embodiments, during an internal code generate phase, the internal code generator 208 generates data usage statements for calculating marked data usage status. In embodiments, the internal code generator 208 inserts the data usage statements into executable program code. For example, the internal code generator 208 may generate a first set of instructions for taking a first snapshot of the variable storage space associated with the marked data when entering a scope of the marked data and a second snapshot of the variable storage space when exiting the scope. The internal code generator 208 may insert the first set of instructions into the executable program code during compile. In embodiments, the internal code generator 208 may generate a second set of instructions for comparing the first and second snapshots. The internal code generator 208 may insert the second set of instructions into the executable program code during compile. In some embodiments, the internal code generator 208 may insert a third set of instructions for performing an action in response to a data threshold being exceeded (e.g., a data usage threshold) into the executable program code.

In this way, when the executable program 110 enters the scope of the marked data, the executable program 110 is configured to save a first snapshot of the variable storage space of data storage 114. When exiting the scope of the marked data, the executable program 110 saves a second snapshot of the variable storage space of data storage 114. The first and second snapshots of the variable storage space are compared by the executable program 110, and a percentage of data usage is calculated. In embodiments, if the marked data exceeds a certain limitation (e.g., a data usage threshold, a data usage limit, etc.) the executable program 110 may generate a notification or warning and output it to a user.

In embodiments, during a compile listing generate phase, the compiler 106 generates the listing 214 which comprises cross reference information for the marked data and associated data that was determined from the marked data dictionary information 210 and the dictionary information 212. In embodiments, the compiler 106 may utilize the listing 214 to generate a compile listing file 216 that may be output to a user. If a notification is sent to a user indicating that the variable storage space of data storage 114 is insufficient for the executable program 110, the cross-reference information in the compile listing file 216 may be used identify which program code needs to modification in the executable program. The compile listing file 216 may comprise one or more of the following: cross-reference info of the marked data; cross-reference information of the marked data's alias (e.g., via the compiler's alias mechanism); cross-reference information of a left value data when the marked data in an assignment statement is a right value; cross-reference information of a left value data when the marked data size in the assignment statement is the right value; and cross-reference information of another operand data when the marked data size a conditional statement (e.g., loop end judgement statement) is the operand. In this way, the compile file 216 may be utilized by a user (e.g., programmer) to easily track down where to modify the program code related to the notification of insufficient data space.

In embodiments, the optimizer 218 may receive internal code and the data usage statements generated by internal code generator 208. The optimizer 218 is configured to utilize the data usage statements to modify the received internal code to improve the operation of the executable program 110. For example, the optimizer 218 may analyze the data usage statements and modify the internal code to cause the executable program to operate with less memory. The code generator 220 will then convert the modified code into a form of program code that may be readily executed/readable by the executable program 110.

Figure 3:
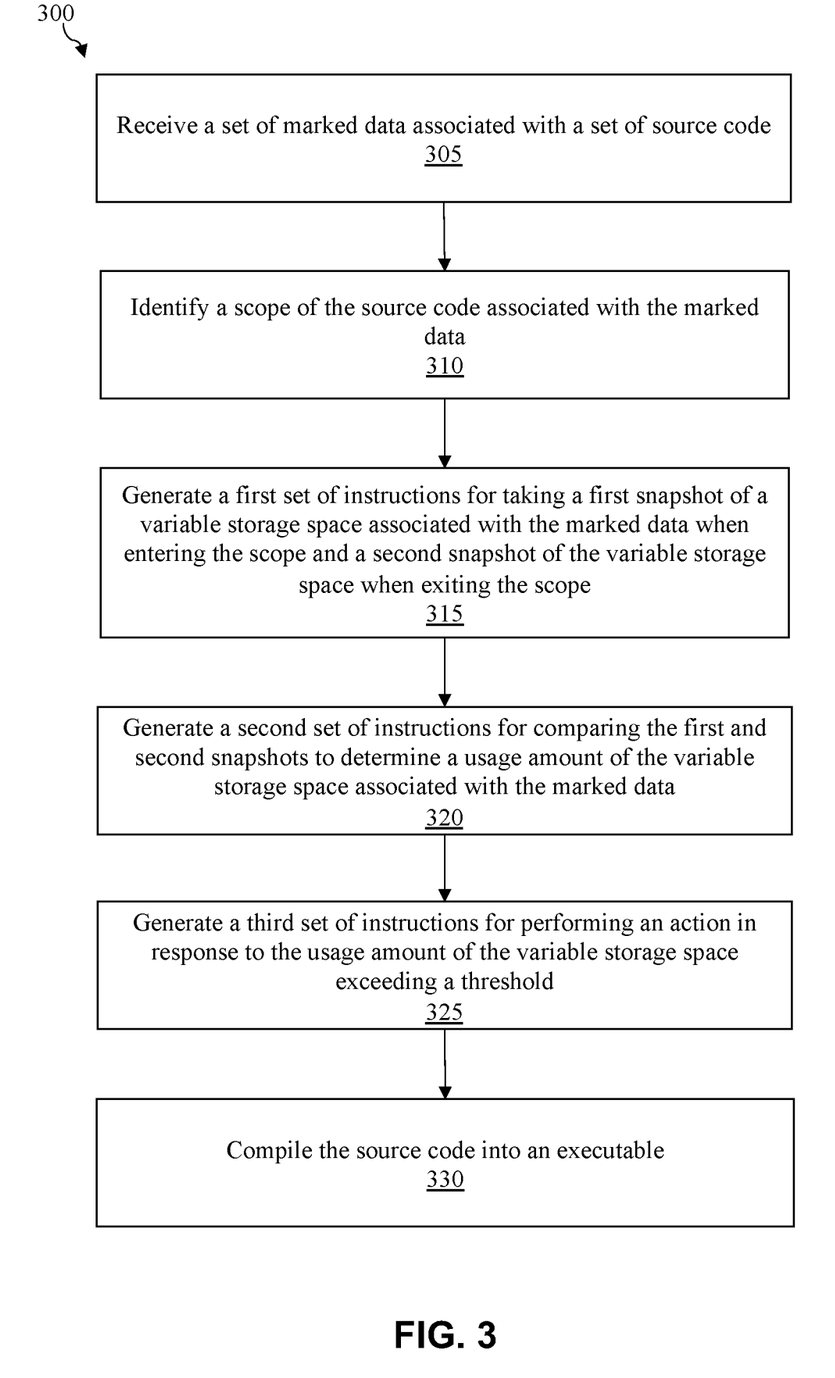
FIG. 3 illustrates a flow diagram of an example process for automatically generating a data usage statement and notifying a user when a data usage threshold has been exceeded, in accordance with embodiments of the present disclosure.

Referring now to FIG. 3, shown is a flow diagram of an example process 300 for automatically generating a data usage statement and notifying a user when a data usage threshold has been exceeded, in accordance with embodiments of the present disclosure. The process 300 may be performed by processing logic that comprises hardware (e.g., circuitry, dedicated logic, programmable logic, microcode, etc.), software (e.g., instructions run on a processor), firmware, or a combination thereof. In some embodiments, the process 300 is a computer-implemented process. The process 300 may be performed by processor 104 exemplified in FIG. 1.

The process 300 begins by receiving a set of marked data associated with a set of source code. In embodiments, the set of marked data associated with the set of source code may be received by a compiler (e.g., compiler 106 of FIG. 1 and FIG. 2). This is illustrated at step 305.

The process 300 continues by identifying a scope of the source code associated with the marked data. This is illustrated at step 310. The scope of the set of marked data may designate what source code may require an expansion in data storage or variable storage space over a time period. An example of the scope of the source code associated with the marked data is further described in FIG. 4.

The process 300 continues by generating a first set of instructions for taking a first snapshot of a variable storage space associated with the marked data when entering the scope and a second snapshot of the variable storage space when exiting the scope. This is illustrated at step 315. In embodiments, the compiler generates the marked data usage statement when generating internal code. The compiler may insert the first set of instructions into the executable program code during compile, such that the executable program is configured to take a snapshot of the variable storage space when entering and exiting the scope associated with the marked data. An example of entering the scope of marked data is further described in FIG. 4.

The process 300 continues by generating a second set of instructions for comparing the first and second snapshots to determine a usage amount of the variable storage space associated with the marked data. This is illustrated at step 320. In embodiments, the compiler generates the second set of instructions for comparing the first and second snapshots and inserts the second set of instructions into the executable program code during compile. In embodiments, while the executable program is running, the instructions cause the executable program to compare the snapshots to determine the data usage of the variable storage space. In embodiments, the executable program will continuously compare the snapshots each time it enters/exits the scope until it is determined that the data usage amount of the variable storage space has exceeded a threshold. In embodiments, the second set of instructions further cause the program to compare the determined data usage to the threshold.

The process 300 continues by generating a third set of instructions for performing an action in response to the usage amount of the variable storage space exceeding a threshold. This is illustrated at step 325. In embodiments, the compiler generates the third set of instructions for performing an action and inserts the third set of instructions into the executable program code during compile. In embodiments, the executable program may perform the action in response to a data threshold being exceeded (e.g., a data usage threshold). For example, if the variable storage space threshold has been exceeded, a notification may be generated and sent to a user. In embodiments, the notification may be a warning indicating that the set of marked data has exceeded a data usage limit (e.g., 75% data usage limitation).

The process 300 continues by compiling the source code into an executable, wherein the executable includes the first, second, and third sets of instructions. This is illustrated at step 330. In embodiments, the compiler may insert the instructions into the executable program code.

In embodiments, an application or program may use the executable program code to automatically determine when data storage has become insufficient for the respective computer program. For example, an application may take, during execution of the application, a first snapshot of a variable storage space associated with a marked object when entering a scope of the marked data in the application. The application may take a second snapshot of the variable storage space when exiting the scope of the marked data. The application may compare the first and second snapshots to determine a usage amount of the variable storage space associated with the marked data. The application may compare the usage amount to a threshold usage amount. If the threshold usage amount has been exceeded, the application may perform an action (e.g., output a warning or notification) in response to the usage amount exceeding the threshold usage amount.

In some embodiments, the process may further comprise determining dictionary information for associated data of the set of marked data. The compiler may generate a compile listing file comprising the dictionary information. Once the compile listing file has been generated, this may be outputted to the user along with the notification to aid the user in determining which program code needs modification in order to increase the available data usage space.

In embodiments, the dictionary information of the compile listing file may include various cross-reference information. Examples of the cross-reference information are further detailed in FIG. 5. For example, the cross-reference information may be related to the set of marked data, to an alias of the set of marked data. In some embodiments, the cross-reference information may include information of the left value data when the set of marked data in an assignment statement is a right value. In some embodiments, the cross-reference information may include information of the left value data when a data size of the set of marked data in the assignment statement is the right value. In some embodiments, the cross-reference information may include information of another operand data when the data size of the set of marked data in a conditional statement is an operand. These are only examples of cross-reference information and are not meant to be limiting.

In some embodiments, the system may utilize machine learning to analyze past data and/or marked data sets to automatically make determinations on which programs may need modification and/or an increase in data storage usage. In such an instance, a notification may or may not be needed to be outputted to the user. For example, based on changes and/or modification to program code for historic arrays, the system may identify similar arrays that may be coming close to and/or exceed data limits based on the data usage statements. Using this information, the system may automatically adjust the data storage for the respective executable program without the need of human intervention. In this way, the system may not need to send a warning or notification to the user since the data storage was automatically expanded. However, in some embodiments, the system may still send a notification to inform the user that the data storage was expanded.

Figure 4:
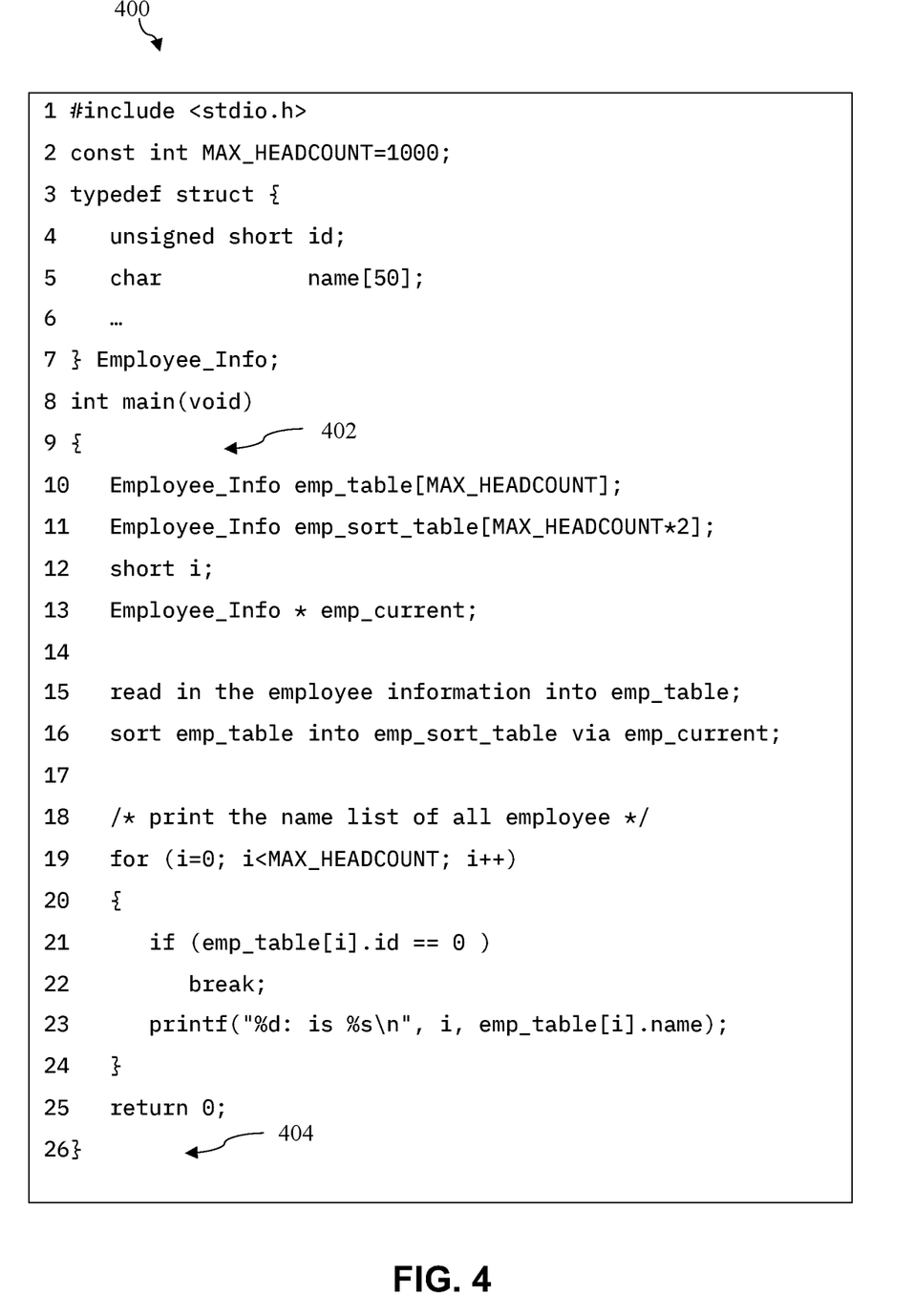
FIG. 4 illustrates an example set of marked data and source code, in accordance with embodiments of the present disclosure.

Referring to FIG. 4, shown is an example set of marked data and program code 400, in accordance with embodiments of the present disclosure. During an internal code generate phase, the compiler will generate data usage statements for calculating marked data usage status. In the illustrated embodiment, "emp_table" is identified as the set of marked data. The compiler may identify the scope of the marked data by determining an entry point 402 and an exit point 404 of the scope. Once determined, the compiler may insert instructions into the executable program code during compile, such that when the executable program enters the entry point 402 of the scope of the set of marked data, a first snapshot of the emp_table's storage space is saved. The instructions may further include executable program code that causes the executable program to save a second snapshot of the emp_table's storage space when exiting the exit point 404 of the scope. The instructions may further include executable program code that causes the executable program to compare the first and second snapshots, calculate a data usage percentage, and generate a data usage statement. The instructions further include executable program code that causes the executable program to generate and output a notification is the marked data exceeds a data usage limit. For example, if the marked data (e.g., "emp_table") exceeds a certain predetermined limitation or threshold (e.g., 80% data space usage), the executable program will generate a notification and output the notification to a user. For example, the notification may be configured as a warning message that states, "The usage of emp_table is over 80%!"

Figure 5:
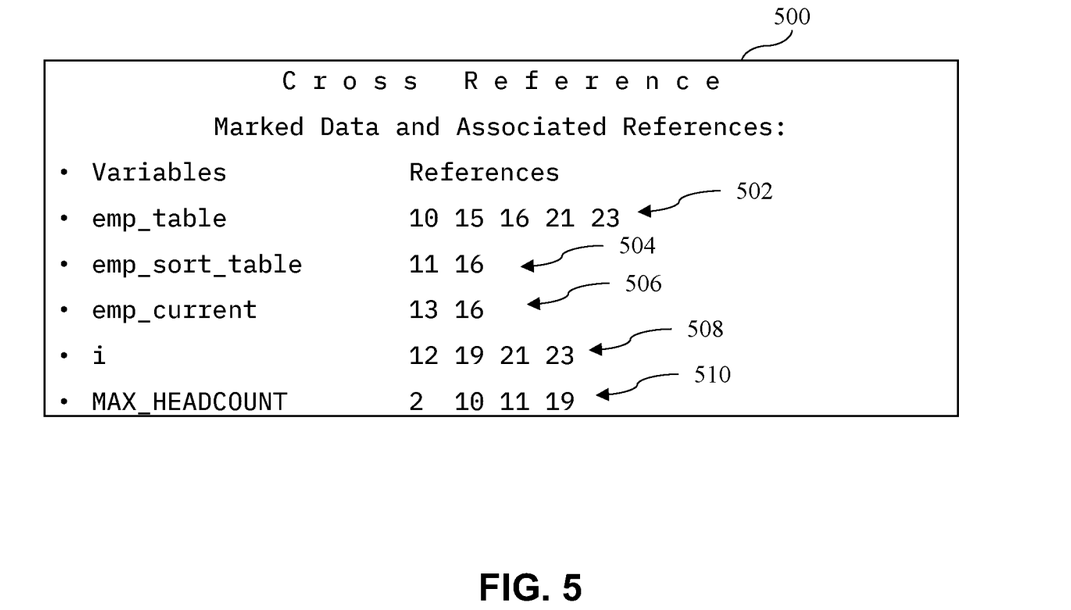
FIG. 5 illustrates an example cross-reference table for marked data, in accordance with embodiments of the present disclosure.

Referring now to FIG. 5, shown is an example cross-reference table 500 for marked data, in accordance with embodiments of the present disclosure. In the illustrated embodiment, the marked data is identified as the "emp_table" as described in FIG. 4. In embodiments a compile listing file may be generated and outputted with the notification by the compiler. The compile listing file may include various cross-reference information related to the set of marked data that may be used by a programmer to quickly refer to when performing modification to any respective program code (e.g., during data storage increasement programming).

For example, in the illustrated embodiment, the compile listing file includes the cross-reference table 500 identifying cross-reference information (values) related to the set of marked data 502 (e.g., "emp_table"). In another example, the cross-reference table 500 may include cross-reference information of the left value data when the set of marked data in an assignment statement is a right value 504 (e.g., "emp_sort_table"). In another example, the cross-reference table 500 may include cross-reference information related to an alias (via a compiler alias mechanism) of the set of marked data 506 (e.g., "emp_current"). In another example, the cross-reference table 500 may include cross-reference information of another operand data when the data size of the set of marked data in a conditional statement is the operand 508 (e.g., "MAX_HEADCOUNT"). In another example, the cross-reference table 500 may include cross-reference information of the left value data when a data size of the set of marked data in the assignment statement is the right value 510 (e.g., "i"). Using the compile listing file, a user (e.g., programmer) can reduce programming time by using the cross-referencing information to quickly decipher where data usage has exceeded certain limits. In this way, the user can reduce timely errors associated with programming mistakes and increase the stability of a respective program by discovering the insufficient data space prior to the program reaching the upper storage limit.

Figure 6:
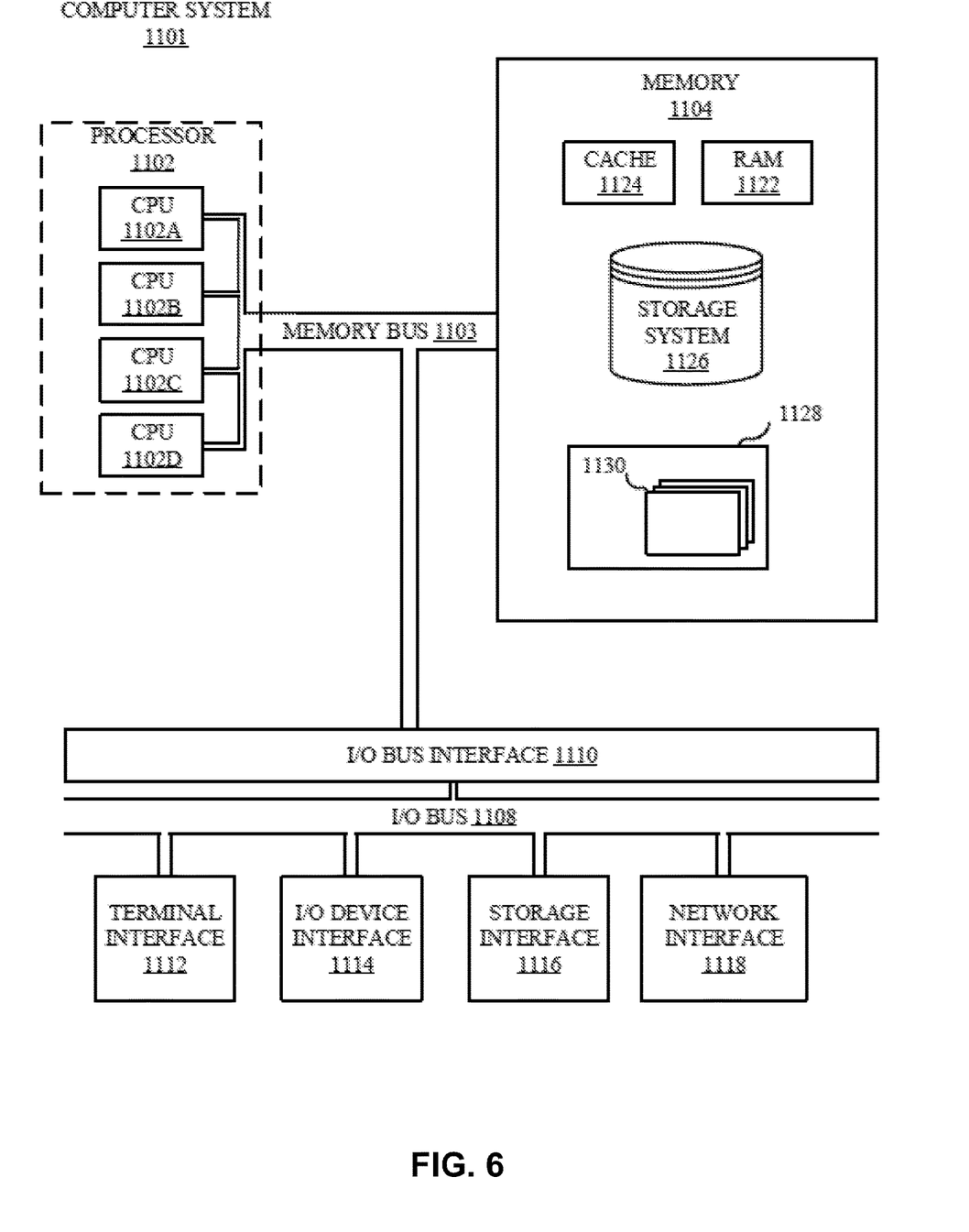
FIG. 6 illustrates a high-level block diagram of an example computer system that may be used in implementing one or more of the methods, tools, and modules, and any related functions, described herein, in accordance with embodiments of the present disclosure.

Referring now to FIG. 6, shown is a high-level block diagram of an example computer system 1101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache. In some embodiments, a processor can include at least one or more of, a memory controller, and/or storage controller. In some embodiments, the CPU can execute the processes included herein (e.g., process 200, 300, and 400).

System memory subsystem 1104 may include computer system readable media in the form of volatile memory, such as random-access memory (RAM) 1122 or cache memory 1124. Computer system 1101 may further include other removable/non-removable, volatile/non-volatile computer system data storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory subsystem 1104 can include flash memory, e.g., a flash memory stick drive or a flash drive. Memory devices can be connected to memory bus 1103 by one or more data media interfaces. The memory subsystem 1104 may include at least one program product having a set (e.g., at least one) of program modules that are configured to carry out the functions of various embodiments.

Although the memory bus 1103 is shown in FIG. 6 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single units, the computer system 1101 may, in some embodiments, contain multiple I/O bus interfaces 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 1101. In some embodiments, however, individual components may have greater or lesser complexity than as represented in FIG. 6, components other than or in addition to those shown in FIG. 6 may be present, and the number, type, and configuration of such components may vary.

One or more programs/utilities 1128, each having at least one set of program modules 1130 may be stored in memory subsystem 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 1128 and/or program modules 1130 generally perform the functions or methodologies of various embodiments.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
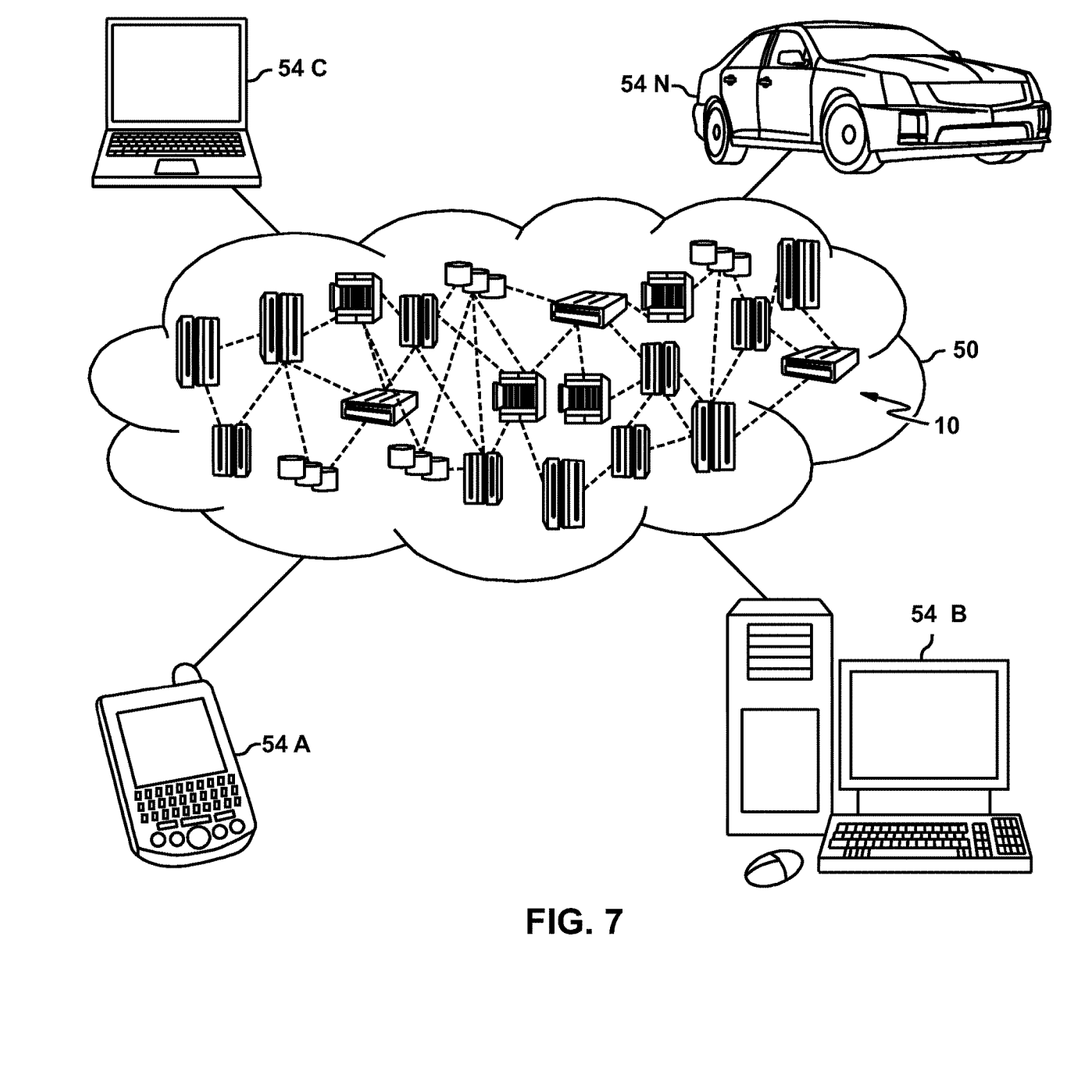
FIG. 7 depicts a cloud computing environment in accordance with embodiments of the present disclosure.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
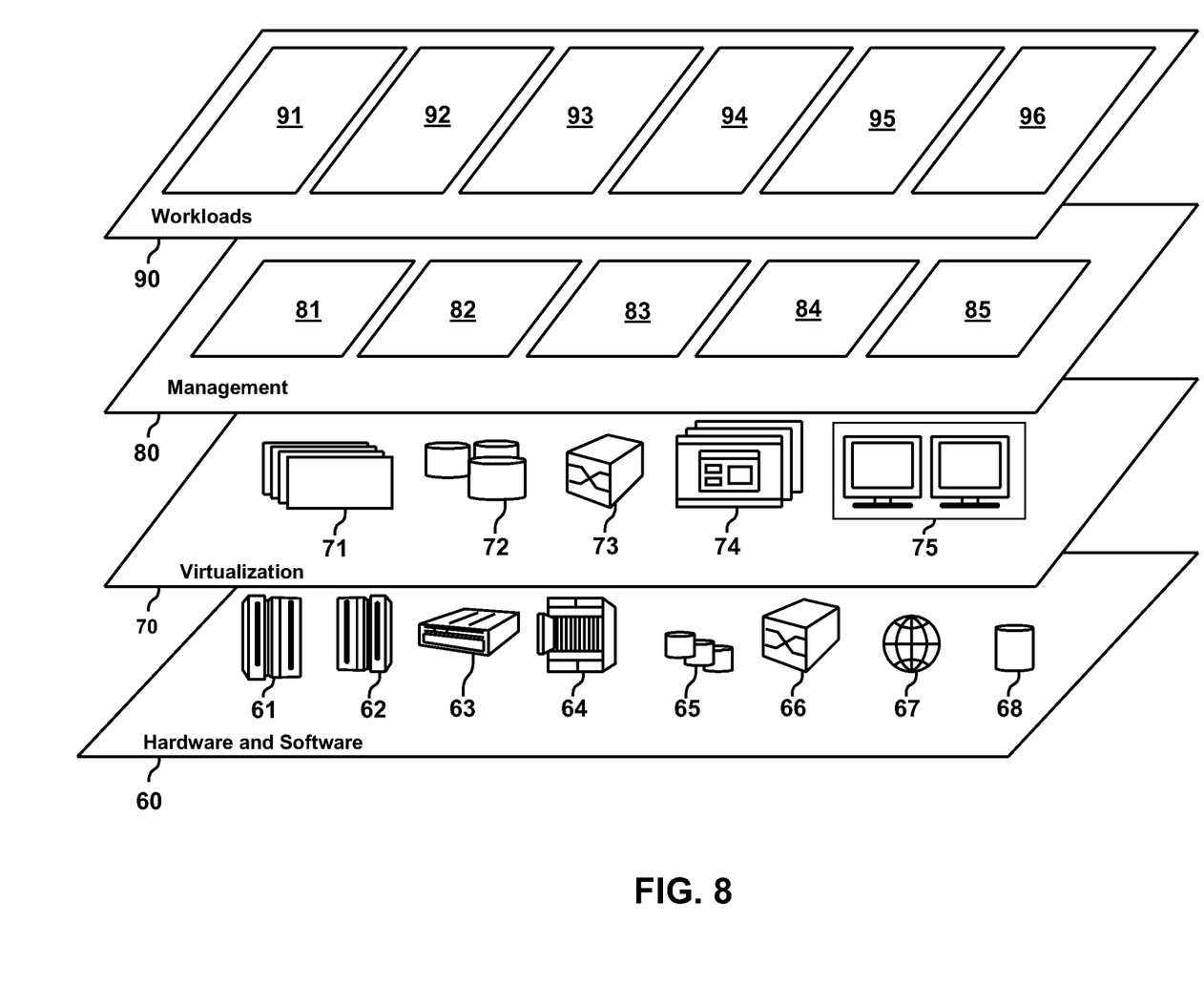
FIG. 8 depicts abstraction model layers in accordance with embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and robotic device scheduling software 68 in relation to the client device 102 of FIG. 1.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method comprising:
   receiving a set of marked data associated with a set of source code;
   identifying a scope of the source code associated with the marked data;
   generating a first set of instructions for taking a first snapshot of a variable storage space associated with the marked data when entering the scope and a second snapshot of the variable storage space when exiting the scope;
   generating a second set of instructions for comparing the first and second snapshots to determine a percentage of data usage of the variable storage space associated with the marked data;
   generating a third set of instructions for performing an action in response to the percentage of data usage of the variable storage space exceeding a data usage threshold, wherein the action in response to the percentage of data usage of the variable storage space exceeding the data usage threshold comprises automatically increasing the variable storage space, and wherein the increasing of the variable storage space is based on analyzing previous modifications to program code for increasing variable storage space of historic arrays; and
   compiling the source code into an executable, wherein the executable includes the first, second, and third sets of instructions.

2. The computer-implemented method of claim 1, further comprising:
   determining dictionary information for associated data of the set of marked data; and
   generating a compile listing file comprising the dictionary information.

3. The computer-implemented method of claim 2, wherein the dictionary information of the compile listing file comprises at least one selected from a group consisting of:
   cross-reference information related to the set of marked data;
   cross-reference information related to an alias of the set of marked data;
   cross-reference information of left value data when the set of marked data in an assignment statement is a right value;
   cross-reference information of the left value data when a data size of the set of marked data in the assignment statement is the right value; and
   cross-reference information of another operand data when the data size of the set of marked data in a conditional statement is an operand.

4. The computer-implemented method of claim 2, further comprising outputting the compile listing file to a user.

5. The computer-implemented method of claim 1, wherein the action in response to the percentage of data usage of the variable storage space exceeding the data usage threshold further comprises instructions for outputting a notification to a user.

6. The computer-implemented method of claim 5, wherein the notification indicates that the set of marked data has exceeded a data usage limit.

7. The computer-implemented method of claim 5, further comprising:
   receiving, in response to the notification, an input from the user to modify the variable storage space.

8. The computer-implemented method of claim 1, wherein the analyzing previous modifications to program code for increasing variable storage space of historic arrays is performed using machine learning.

9. A system comprising:
   a processor; and
   a computer-readable storage medium communicatively coupled to the processor and storing program instructions which, when executed by the processor, cause the processor to perform a method comprising:
   receiving a set of marked data associated with a set of source code;
   identifying a scope of the source code associated with the marked data;
   generating a first set of instructions for taking a first snapshot of a variable storage space associated with the marked data when entering the scope and a second snapshot of the variable storage space when exiting the scope;

generating a second set of instructions for comparing the first and second snapshots to determine a percentage of data usage of the variable storage space associated with the marked data;

generating a third set of instruction for performing an action in response to the percentage of data usage of the variable storage space exceeding a data usage threshold, wherein the action in response to the percentage of data usage of the variable storage space exceeding the data usage threshold comprises automatically increasing the variable storage space, and wherein the increasing of the variable storage space is based on analyzing previous modifications to program code for increasing variable storage space of historic arrays; and compiling the source code into an executable, wherein the executable includes the first, second, and third sets of instructions.

10. The system of claim 9, wherein the method performed by the processor further comprises:

determining dictionary information for associated data of the set of marked data; and generating a compile listing file comprising the dictionary information.

11. The system of claim 10, wherein the dictionary information of the compile listing file comprises at least one selected from a group consisting of:

cross-reference information related to the set of marked data;

cross-reference information related to an alias of the set of marked data;

cross-reference information of left value data when the set of marked data in an assignment statement is a right value;

cross-reference information of the left value data when a data size of the set of marked data in the assignment statement is the right value; and cross-reference information of another operand data when the data size of the set of marked data in a conditional statement is an operand.

12. A computer program product comprising a computer-readable storage medium having program instructions embodied therewith, the program instructions executable by a processor to cause the processor to perform a method comprising:

receiving a set of marked data associated with a set of source code;

identifying a scope of the source code associated with the marked data;

generating a first set of instructions for taking a first snapshot of a variable storage space associated with the marked data when entering the scope and a second snapshot of the variable storage space when exiting the scope;

generating a second set of instructions for comparing the first and second snapshots to determine a percentage of data usage of the variable storage space associated with the marked data;

generating a third set of instructions for performing an action in response to the percentage of data usage of the variable storage space exceeding a data usage threshold, wherein the action in response to the percentage of data usage of the variable storage space exceeding the data usage threshold comprises automatically increasing the variable storage space, and wherein the increasing of the variable storage space is based on analyzing previous modifications to program code for increasing variable storage space of historic arrays; and compiling the source code into an executable, wherein the executable includes the first, second, and third sets of instructions.

13. The computer program product of claim 12, wherein the method performed by the processor further comprises:

determining dictionary information for associated data of the set of marked data; and generating a compile listing file comprising the dictionary information.

14. The computer program product of claim 13, wherein the dictionary information of the compile listing file comprises at least one selected from a group consisting of:

cross-reference information related to the set of marked data;

cross-reference information related to an alias of the set of marked data;

cross-reference information of left value data when the set of marked data in an assignment statement is a right value;

cross-reference information of the left value data when a data size of the set of marked data in the assignment statement is the right value; and cross-reference information of another operand data when the data size of the set of marked data in a conditional statement is an operand.

15. The computer program product of claim 13, wherein the method performed by the processor further comprises outputting the compile listing file to a user.

16. The computer program product of claim 12, wherein the action in response to the percentage of data usage of the variable storage space exceeding the data usage threshold further comprises instructions for outputting a notification to a user.

* * * * *